Nov. 11, 1958 J. J. LATTUCA 2,859,557
PLASTIC FLOWER POT
Filed July 9, 1956
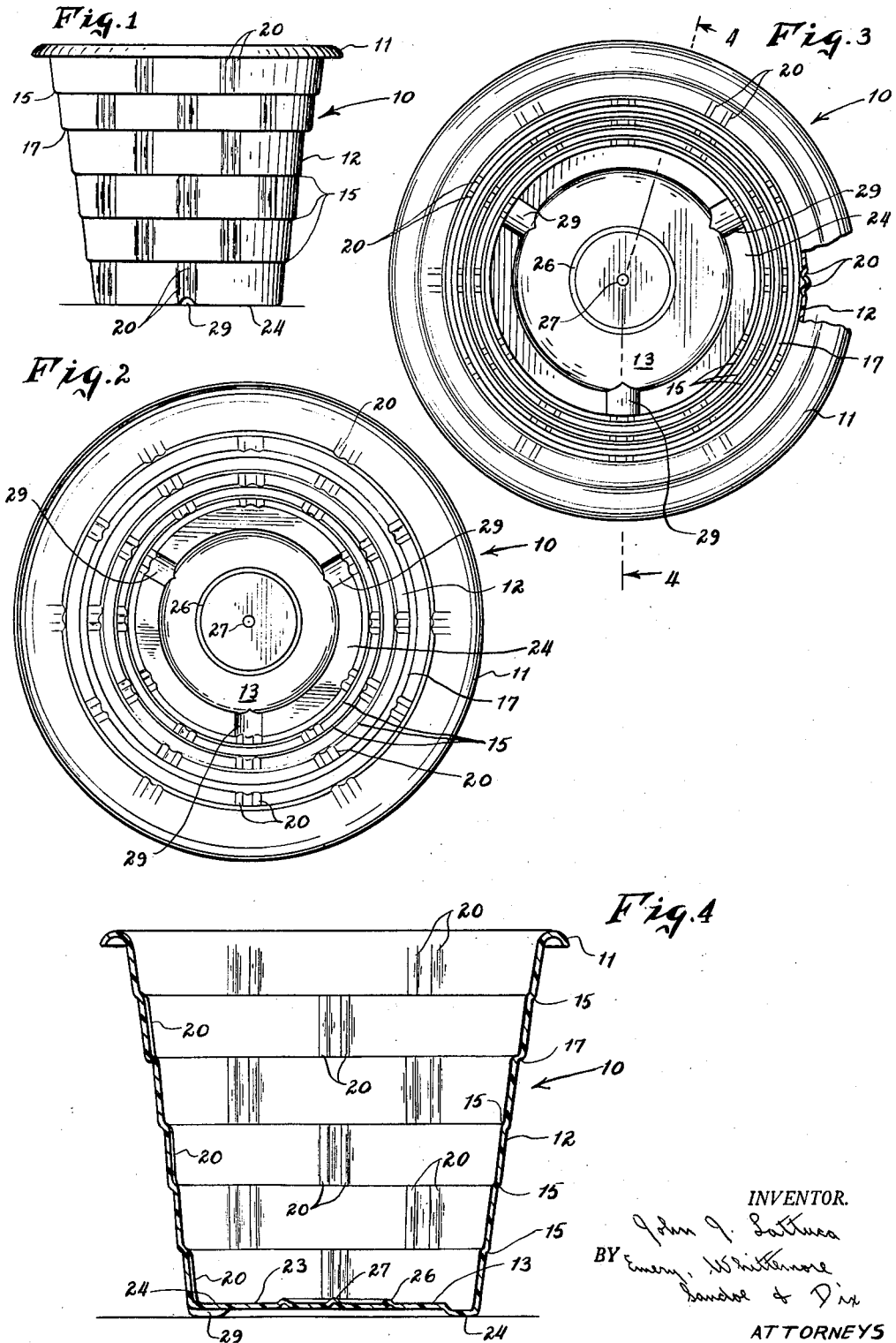
INVENTOR.
John J. Lattuca
BY Emery, Whittemore
Sandoe & Dix
ATTORNEYS United States Patent Office 2,859,557
Patented Nov. 11, 1958

2,859,557

PLASTIC FLOWER POT

John J. Lattuca, Hempstead, N. Y., assignor to Best Plastics Corporation, Brooklyn, N. Y., a corporation of New York Application July 9, 1956, Serial No. 596,600

1 Claim. (Cl. 47—34)

This invention relates to plastic flower pots and more especially to flower pots made of sheet plastic material and constructed so as to be made by vacuum forming.

Flower pots made from clay have long been used both for shipping and raising plants, and these flower pots have had numerous disadvantages, some of which have been their heavy weight, easy breakage, large water losses by evaporation and the fact that they are subject to deleterious fungi growths. Improved flower pots have been molded of plastic material, but such flower pots are expensive.

I have discovered that improved flower pots can be made of sheet plastic material by vacuum forming if the flower pot is made with certain structural features which compensate for the light weight and flexibility of the sheet material.

In its broader aspects, it is an object of this invention to provide an improved flower pot made of sheet plastic material by vacuum forming and with the sheet material shaped and corrugated to obtain the necessary strength for flower pot service.

The use of sheet material reduces the cost and weight of the flower pot of this invention, as compared with earlier flower pots, and it results in a very substantial saving in freight when plants are shipped. The plastic flower pots of this invention are not subject to deterioration with age, they are free from fungus growth and they prevent the loss of water by evaporation from the earth in which the plants are growing. Experience has shown that better root growth is promoted by plastic flower pots as compared with the usual clay pots.

Another object of the invention is to provide a plastic flower pot which is imperforate for preventing drainage of moisture from the pots during shipment, but which is constructed for convenient perforation of the bottom when the flower pots are delivered by the shipper to users who employ the pots for growing plants under conditions where bottom drainage is desired. Another advantage of a bottom construction which can be conveniently perforated by the user is that the size of the perforation, or the number of perforations, can be selected for controlled drainage in accordance with the kind of plant in the flower pot and the kind of holders in which the flower pots are to be supported.

A very substantial saving in cost can be obtained in the original delivery of the flower pots of this invention because the thin walls of the flower pots permit the nesting of a large number of pots of similar size in a small space; and the thin-wall construction also makes practical the construction of sets of flower pots of different size, which fit within one another when empty.

Other objects, features and advantages of the invention will appear or be pointed out as the description proceeds.

In the drawing, forming a part hereof, in which like reference characters indicate corresponding parts in all the views:

Figure 1 is a side elevation of a flower pot made in accordance with this invention;

Figure 2 is an enlarged top plan view, partly broken away and in section, of the flower pot shown in Figure 1;

Figure 3 is an enlarged bottom plan view of the flower pot shown in the other figures; and Figure 4 is a vertical sectional view taken on the line 4—4 of Figure 3.

Figure 1 shows a flower pot 10 having a top rim 11, a side wall 12 and a bottom 13. The flower pot is generally circular in cross section and of larger diameter toward its upper end. The reduction in diameter occurs at steps 15. These steps extend circumferentially around the entire circumference of the flower pot and they are spaced from one another in the direction of the height of the pot. The steps include on step 17 of substantially greater radial extent than the other steps; and the step 17 is located intermediate the upper end of the flower pot and a mid region of the height of the flower pot. The shoulders provided by these steps stiffen the side 12 of the flower pot against deflection by radially applied forces, but supplies little or no stiffening against telescoping forces applied in the direction of the height of the flower pot.

In order to supply additional strength for preventing collapse of the flower pot by such telescoping forces, the side 12 is provided with substantially vertical corrugations 20. These corrugations 20 are preferably made in pairs, both corrugations of each pair being located comparatively close together, and the pairs being angularly spaced around the circumference of the flower pot. The purpose of having pairs of corrugations is twofold. It provides additional strength and also makes possible a construction which simulates a basket weave, thus adding a decorative effect which increases the attractiveness of the flower pot.

In order to obtain this simulated basket weave, each of the corrugations 20 extends only from one shoulder 15 to the next. The surface of the side 12 between the next two shoulders is then smooth and other corrugations 20 are formed in the wall 12 between the next two shoulders and in alignment with the preceding corrugations. There are, therefore, aligned pairs of corrugations in alternate areas of the side wall as bounded by the steps 15.

The pairs of corrugations 20 in the adjacent circumferential areas between steps 15 are in staggered relation to one another, as clearly shown in Figure 1, in order to obtain a more realistic simulation of a basket weave. This distribution of the corrugations 20, in addition to producing a more decorative effect, has the utilitarian function of distributing the stiffening of the wall 12 more widely over the side area of the flower pot.

The material of the side wall 12 is a sheet plastic material having a gage within the range from 10 to 40; and preferably within the range of 15 to 20. The preferred construction is made with high impact styrene, but other flexible plastic sheet material can be used. The flexibility is sufficient to permit the flower pot to be collapsed radially without breaking. Other plastic materials can be used, for example cellulose acetate, ethyl cellulose and cellulose acetate butyrate.

The bottom 13 of the flower pot has a raised center area 23 and an annular peripheral area 24 which rests on the surface on which the flower pot is supported. There is a circular, upwardly depressed corrugation 26 near the middle of the raised center area 23 and there is an upward depression 27 at the center of the pot. A hole is punched in this depression 27 when it is desired to have the flower pot drain; for further drainage, holes can be punched in any portion of the bottom. In order to facilitate the drainage when the flower pot is resting on a flat surface, there are radially extending corrugations 29 in the annular area 24. These corrugations 29 extend across the entire radial width of the annular area 24 and permit water to drain out from under the flower pot.

At its upper end, the wall 12 has the sheet material curved outwardly to form the rim 11 which is preferably of arcuate cross section and close to 180° of angular extent in the construction illustrated. This shape of the rim 11 provides additional stiffening of the side wall at the top where the stiffening is most needed. The step 17, of greater radial extent than the other steps and located near the top of the side wall, also increases the stiffness at the top of the flower pot.

The preferred embodiment of the invention has been illustrated and described, but changes and modifications can be made and some features can be used in different combinations without departing from the invention as defined in the claim.

What is claimed is:

A plastic flower pot consisting of a single sheet of plastic material of a gage within the range of 10 to 40, the flower pot being of generally circular cross section and having a bottom and a side wall that diverges toward its upper end, the sheet material of the side wall being formed with contours providing ridges extending around the circular extent of the flower pot to stiffen the side wall against distortion out of the normal circular cross-sectional shape of the pot and the contours providing said ridges being combined with other contours of the sheet material providing other ridges extending from top to bottom of the side wall to prevent telescoping of the sheet material in the direction of the height of the pot, a flange extending outwardly from the upper end of the wall and at a substantial angle to the side wall, the flange being of the same thickness and same sheet as the rest of the pot, the bottom and side wall of the pot having continuous and imperforate surfaces.

References Cited in the file of this patent

UNITED STATES PATENTS

| | | |
|---|---|---|
| D. 110,286 | Krehbiel | June 28, 1938 |
| 1,213,940 | Parker | Jan. 30, 1917 |
| 1,778,150 | Freeburg | Oct. 14, 1930 |
| 1,896,229 | Ellis | Feb. 7, 1933 |
| 2,238,132 | Ritter | Apr. 15, 1941 |
| 2,253,817 | Simmons | Aug. 26, 1941 |

FOREIGN PATENTS

| | | |
|---|---|---|
| 517,062 | Great Britain | Jan. 18, 1940 |
| 674,471 | Great Britain | June 25, 1952 |
| 151,592 | Switzerland | Mar. 1, 1932 |